United States Patent [19]

Hattori et al.

[11] Patent Number: 4,799,569

[45] Date of Patent: Jan. 24, 1989

[54] MOTORCYCLE

[75] Inventors: Shigeru Hattori, Tokyo; Toshimitsu Asakura, Saitama, both of Japan

[73] Assignee: Honda Giken Kogyo Kabushiki Kaisha, Tokyo, Japan

[21] Appl. No.: 899,063

[22] Filed: Aug. 21, 1986

[30] Foreign Application Priority Data

Aug. 23, 1985 [JP] Japan ............................. 60/185196
Oct. 7, 1985 [JP] Japan ............................. 60/223097
Oct. 16, 1985 [JP] Japan ............................. 60/230853

[51] Int. Cl.$^4$ ............................................. B62J 35/00
[52] U.S. Cl. ............................. 180/219; 180/68.1; 180/68.3; 180/225; 180/229; 280/833
[58] Field of Search .......... 180/219, 225, 229, 68.1, 180/68.3; 280/9 H, 5 A, 281 B, 281 A

[56] References Cited

U.S. PATENT DOCUMENTS

| 2,902,240 | 9/1959 | La Belle | 280/5 H X |
| 4,484,651 | 11/1984 | Hattori et al. | 280/5 A X |
| 4,509,613 | 4/1985 | Yamaguchi | 180/219 |
| 4,570,740 | 2/1986 | Hara | 180/229 |
| 4,618,020 | 10/1986 | Noda et al. | 180/229 |
| 4,648,474 | 3/1987 | Shinozaki et al. | 180/219 |

FOREIGN PATENT DOCUMENTS

| 1118632 | 11/1961 | Fed. Rep. of Germany | 180/225 |
| 1121317 | 4/1956 | France | |
| 210642 | 2/1924 | United Kingdom | 180/225 |
| 524825 | 8/1940 | United Kingdom | |

Primary Examiner—David M. Mitchell
Assistant Examiner—Mitchell J. Hill
Attorney, Agent, or Firm—Lyon & Lyon

[57] ABSTRACT

A motorcycle carrying a fuel tank of large capacity on a body frame, wherein the fuel tank is hung down to a position sideward of an engine and is divided in its structure to have right and left side sections, at least one of the two sections of the fuel tank being made pivotable to provide an easy access to other equipments for maintenance.

9 Claims, 11 Drawing Sheets

MOTORCYCLE

BACKGROUND OF THE INVENTION

1. Field of the Invention

The present invention relates to a motorcycle and, more particularly, to a motorcycle carrying a fuel tank of large capacity thereon to travel a long distance.

2. Description of the Prior Art

In a conventional motorcycle of this type, particularly when it carries a water-cooled engine, it is tried to increase the capacity of a fuel tank by handing the tank down to a position sideward of the engine.

When the fuel tank is constructed as described above, an air cleaner, a carburetor and sides of the engine are surrounded by the tank, making it difficult to provide an access to these devices for maintenance.

If the air cleaner is disposed below a main frame of an automotive body frame in order to avoid the tank, the cleaner approaches the road surface. Then, the air cleaner tends to intake much dust and mud together with new air. When the cleaner approaches the engine, it becomes difficult to give a necessary length to an intake system which connects between the cleaner and the engine.

Further, if the motorcycle carrying a fuel tank of large capacity employs a water-cooled engine, it also becomes difficult to secure a passage for the air passing through a radiator without interference with the tank and other surrounding devices.

Conventional motorcycles having the abovementioned structures are disclosed in Japanese Utility Model Application Laid-open No. 118930/1982 official gazette and Japanese Patent Application Laid-open No. 204918/1983 official gazette.

SUMMARY OF THE INVENTION

It is therefore an object of the present invention to provide a motorcycle carrying a fuel tank of large capacity wherein even if such a fuel tank is carried, the maintenance of other devices can be facilitated and efficient operation of the other devices can be assured.

According to a first aspect of the present invention, in order to achieve the above object, there is provided a motorcycle having a body frame, on which frame are carried an engine and a fuel tank, said fuel tank being suspended down to a position sideward of the engine and being divided into right and left side sections, at least one of the two sections of the fuel tank being formed pivotable.

With such arrangement, the fuel tank can be constructed to have large capacity. By pivoting one of the divided sections of the fuel tank, equipments such as an engine which are covered at the side by the tank can be exposed to the outside on the body frame, thus facilitating their maintenance.

According to a second aspect of the present invention, in addition to the above features, a motorcycle is constructed to have an air cleaner straddled on the main frame of the body frame at a position forwardly upward of the fuel tank, the cleaning chamber of the air cleaner being divided into right and left side parts on the main frame.

With such special disposition of the air cleaner, the rate of intake of foreign materials such as dusts and mud can be reduced, and an intake system for connecting the air cleaner to the engine can be assured required length and can be disposed at suitable position to contribute to the improvement in the engine performance, and the maintenance of the air cleaner can be further improved. Further, when a multicylinder type engine is employed, air can be fed individually and separately from the right and left side parts of the cleaning chamber of the cleaner to respective cylinders, thereby improving the air intake efficiency.

In addition, according to a third another aspect of the present invention, a motorcycle is further constructed such that a ventilation passage is defined extending longitudinally of an automotive body through between the right and left hanging sections of the fuel tank, a pair of radiators are provided in front of the hanging sections of the fuel tank with a lateral spacing therebetween so as not to block an inlet for the ventilation passage, these radiators being disposed to increase the interval therebetween toward front, and air guide surfaces being formed on the right and left hanging sections of the fuel tank for releasing the air having passed the radiators toward both sides of the fuel tank.

With this arrangement, the hot air passing the radiators is guided by the air guide surfaces to outsides of the fuel tank, while cold air passing between the radiators is guided to the ventilation passage defined between the right and left hanging sections of the fuel tank to effectively cool the engine and is then discharged backward. These airs do not directly hit a rider of the motorcycle.

The above and other objects, features and advantages of the present invention will become apparent from the following description of preferred embodiments taken in conjunction with the accompanying drawings.

BRIEF DESCRIPTION OF THE DRAWINGS

Drawings show some embodiments according to the present invention.

FIGS. 1 to 7 illustrate a first embodiment of the present invention, wherein

FIGS. 8 to 11 illustrate a second embodiment of the present invention, wherein

DESCRIPTION OF THE PREFERRED EMBODIMENTS

The accompanying drawings illustrate preferred embodiments according to the present invention, wherein the corresponding parts are designated by the same reference numerals through the embodiments.

Figure 1:
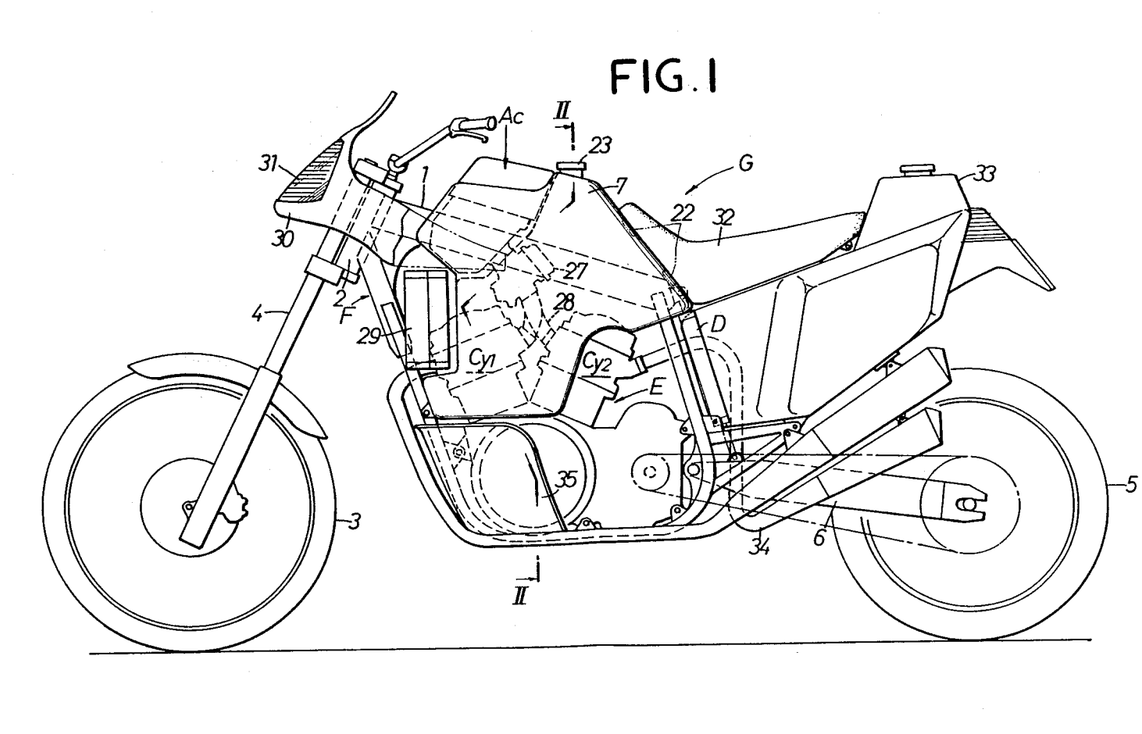
FIG. 1 is a side view of the entire arrangement of a motorcycle.

FIGS. 1 to 7 illustrate a first embodiment of the present invention. In FIG. 1, a body frame F having a single main frame 1 carries at substantially the lower central portion thereof a water-cooled 2-cylinder V-type engine E in which a pair of cylinders $Cy_1$, $Cy_2$ are disposed longitudinally of the body frame F. A front fork 4 suspends a front wheel 3 and is steerably supported to a head pipe 2 at the front end of the body frame F, and a rear fork 6 which journals a rear wheel 5 is suspended vertically rockably to the rear portion of the body frame F through a rear cushion D.

Figure 2:
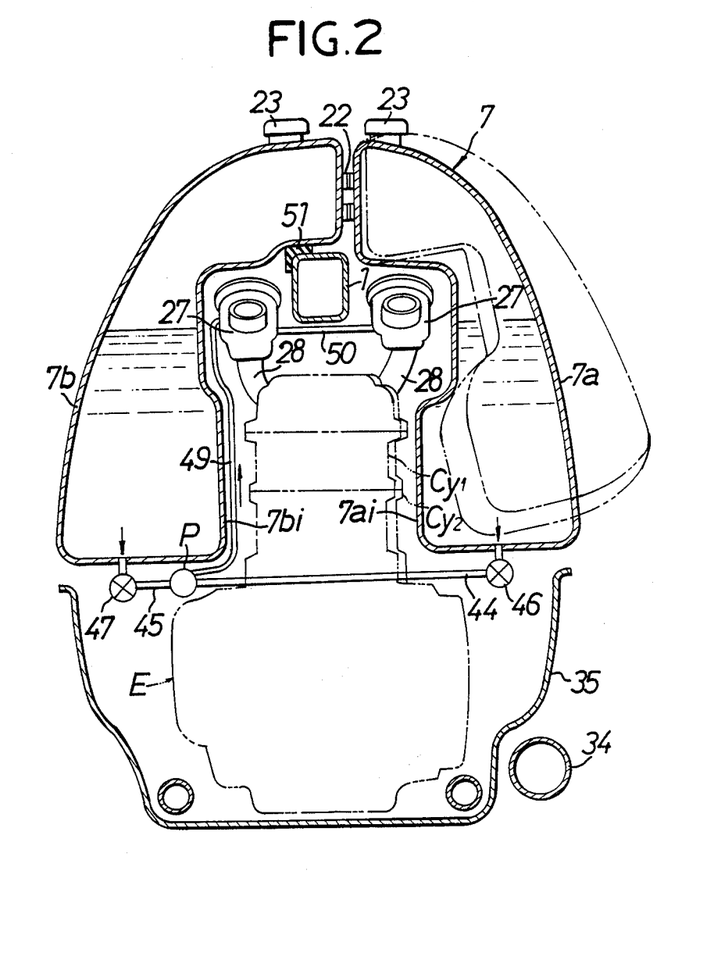
FIG. 2 is a sectional view taken along the line II—II in FIG. 1.
Figure 3:
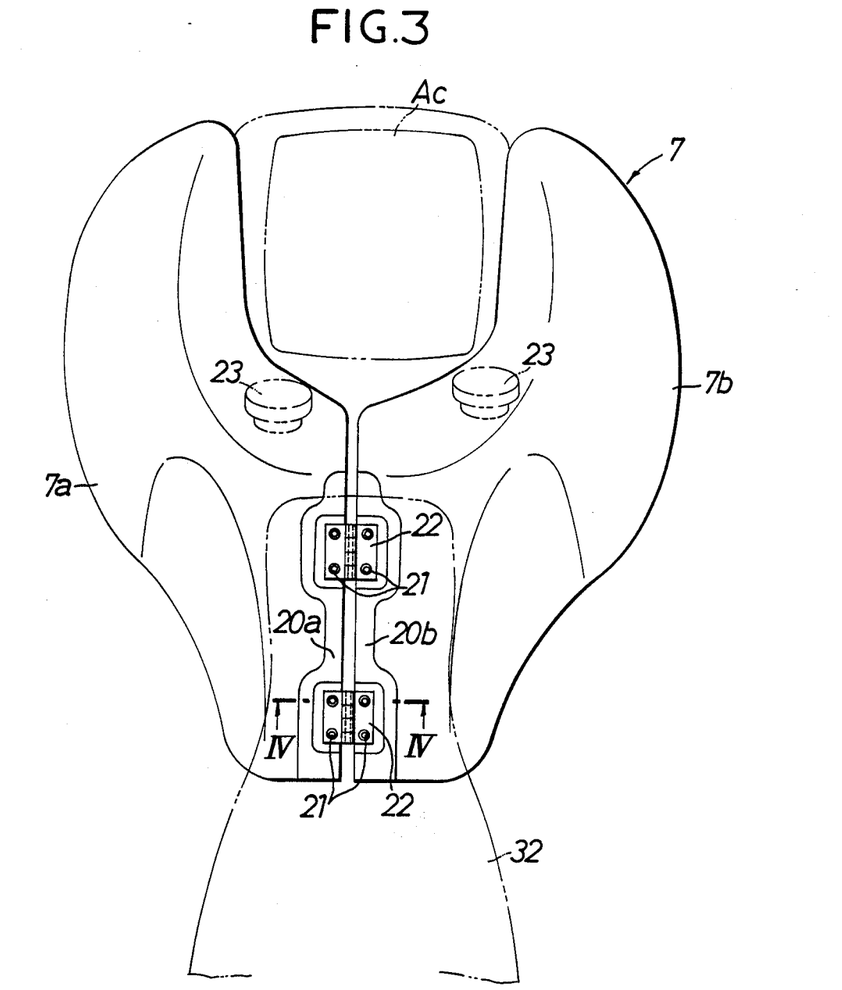
FIG. 3 is a view shown in the direction of an arrow G in FIG. 1.

The main frame 1 of the body frame F is disposed running longitudinally above the V-type engine E. An air cleaner Ac is straddled over the front portion of the main frame 1, and main fuel tank 7 is formed of a generally bifurcated construction so as to be similarly straddled over the rear portion of the main frame 1. The main fuel tank 7 has, therefore, a body divided into right and left sections, which serve, as shown in FIGS. 2 and 3, as left and right side tanks 7a and 7b. The left and right side tanks 7a and 7b are suspended or hung down at both sides of the tank 7, as shown, to at least partly cover the air cleaner Ac, a pair of carburetors 27, 27 connected to the air cleaner Ac, and the sides of the cylinders $Cy_1$, $Cy_2$ of the engine E connected through intake manifolds 28, 28 to the carburetors 27, 27, respectively. Further, inwardly projecting portions 7ai, 7bi are respectively formed on the opposed lower inner walls of the both hung left and right side tanks 7a and 7b so as to increase the capacity of the tank, contributing to the lowering of the center of gravity of the main fuel tank 7.

Figure 4:
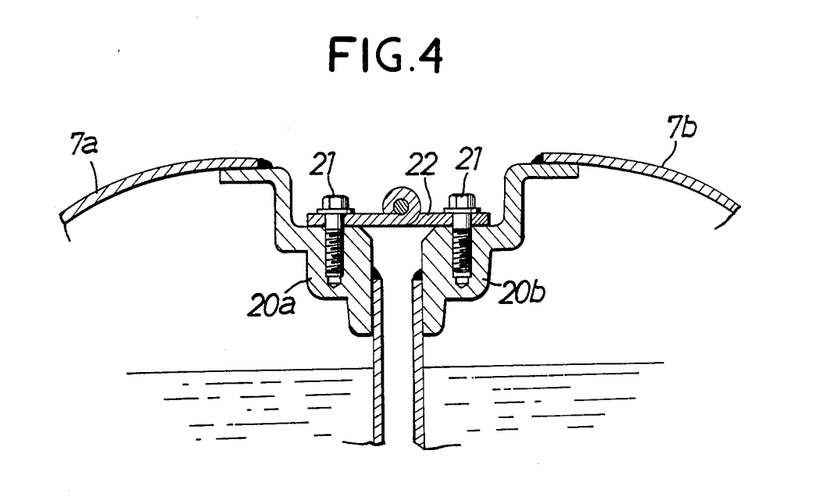
FIG. 4 is a sectional view taken along the line IV—IV in FIG. 3.

Thick frames 20a and 20b are welded, as shown in FIGS. 3 and 4, to the upper opposing surfaces of the left and right side tanks 7a and 7b, and the tanks 7a and 7b are coupled together at their upper portions by two hinges 22, 22 which are attached by clamping bolts 21, . . . over between the frames 20a and 20b. In this embodiment, the left side tank 7a is constructed, as designated by dotted chain lines in FIG. 2, to be upwardly rotatable around the hinges 22, 22 as a center. Filler caps 23, 23 are threaded on the upper surfaces of the left and right side tanks 7a and 7b. As shown in FIG. 2, fuel pipes 44, 45 are led from the lower surfaces of both the tanks 7a and 7b, and are coupled through fuel cocks 46, 47 with a fuel pump P. One fuel pipe 49 is led from the fuel pump P, and coupled with one carburetor 27. The left and right side carburetors 27 and 27 are arranged to communicate with each other through a fuel pipe 50. In FIG. 2, reference numeral 51 designates a cushion rubber interposed between the main frame 1 and the right side tank 7b to support the weight of the occupant riding on the motorcycle.

A seat 32 is disposed at the rear of the main fuel tank 7. In FIG. 1, reference numeral 29 designates a radiator, numeral 30 a front cowl, numeral 31 a headlight, and numeral 35 a skid plate.

A sub tank 33 separate from the main fuel tank 7 is provided at the rear of the seat 32. The sub tank 33 is constructed by welding a pressed thin metal plate to a rear frame, not shown, of the body frame F as a base.

Figure 5:
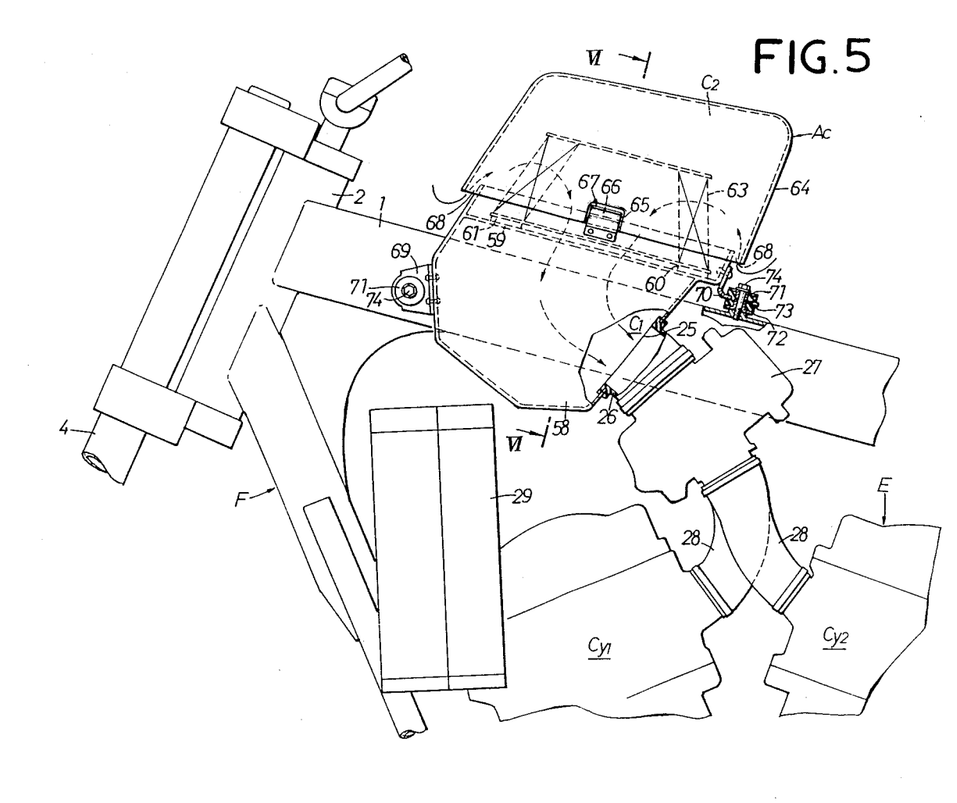
FIG. 5 is a partially cutaway enlarged side view of an air cleaner and its periphery.
Figure 6:
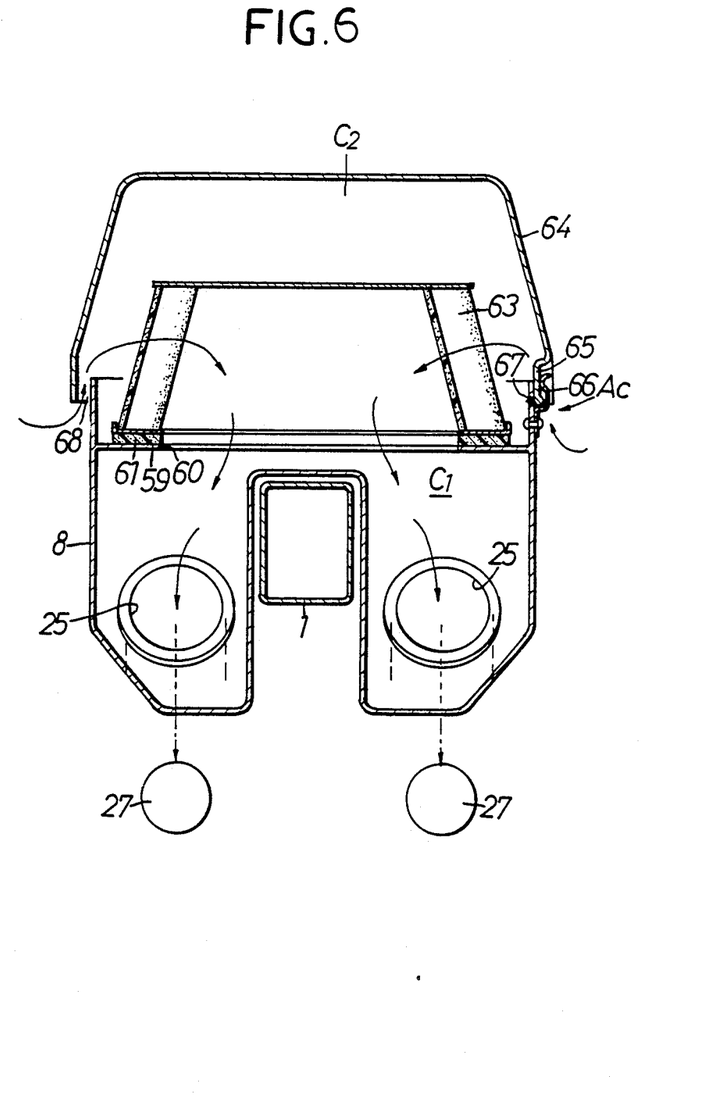
FIG. 6 is a sectional view taken along the line VI—VI in FIG. 5.
Figure 7:
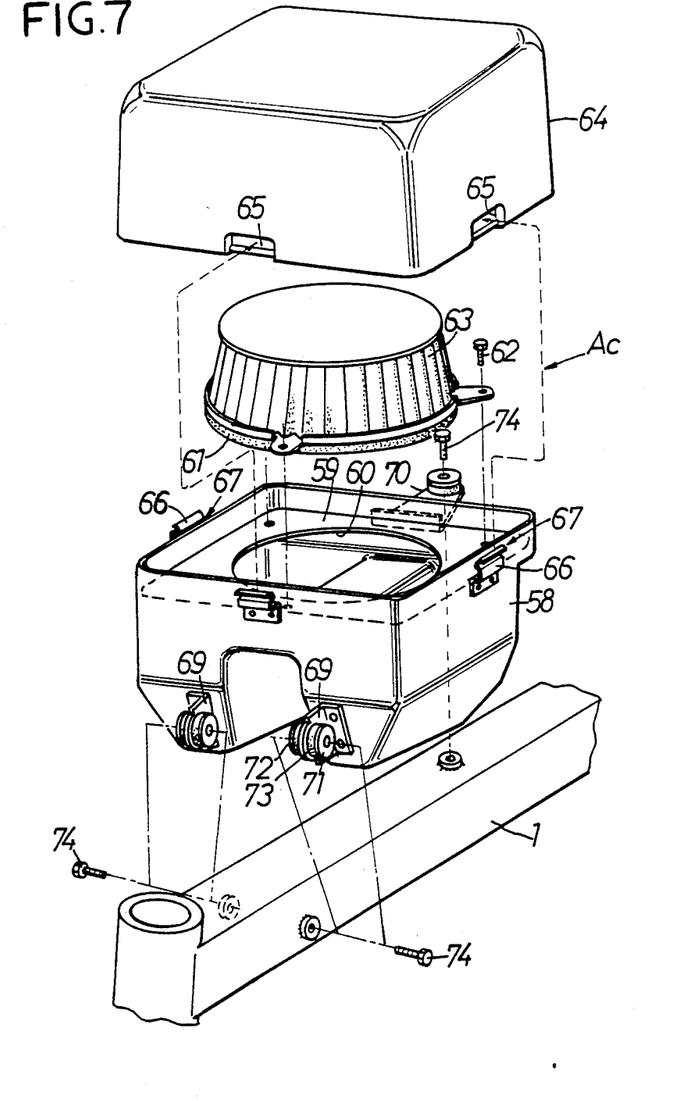
FIG. 7 is an exploded perspective view of the air cleaner.

Referring to FIGS. 5 to 7, the construction of the air cleaner $A_c$ will be described. A cleaner case 58 of the air cleaner $A_c$ is formed in a saddle shape to straddle over the main frame 1. An upper wall 59 of the case 58 is formed in a square shape, and a circular opening 60 is opened at the center of the upper wall 50.

A cleaner element 63 formed in a trapezoidal conical shape is clamped by bolts 62 to the upper wall 59 of the cleaner case 58 to cover the opening 60 through an annular sealing member 61. The cleaner element 63 has its inside communicated with the interior of the case 58 through the opening 60, and a cleaning chamber $C_1$ is defined by the cleaner element 63 and the cleaner case 58.

A cleaner cap 64 of square shape opened at the lower surface is put over the upper portion of the cleaner case 58 to cover the cleaner element 63. Receptacle portions 65, . . . made of recesses are respectively formed integrally on lower outside edge surfaces of the front portion and both the side portions of the cleaner cap 65. Elastic plug portions 67, . . . having elastic clipping pieces 66 are formed correspondingly to the receptacle portions 65, . . . on upper outside edge surfaces of the front portion and side portions of the cleaner case 58. Therefore, the cleaner cap 64 is detachably mounted onto the cleaner case 58 by inserting the receptacle portions 65, . . . into the plug portions 67, . . . An uncleaning chamber $C_2$ is formed between the cleaner cap 64 and the cleaner element 63.

As apparently shown in FIG. 6, a gap 68 is formed between the upper edge of the cleaner case 58 and the lower edge of the cleaner cap 64 over their entire peripheries except the plug portions 67 and the receptacle portions 65. This gap serves as an inlet of the air cleaner Ac for communicating the atmospheric air with the uncleaning chamber $C_2$. Thus, new air is flowed through the inlet 68 into the uncleaning chamber $C_2$ from the atmosphere when the engine E is operating.

As shown in FIGS. 5 and 6, front stays 69, 69 and a rear stay 70 are respectively secured to the front lower wall and the rear upper wall of the cleaner case 58. A pair of collars 71, 72 which hold an elastic bush 73 therebetween are attached to each of the stays 69, 69 and 70.

As shown in FIG. 5 and 6, the air cleaner Ac is mounted to the main frame 1 in a straddling manner by straddling its cleaner case 58 over the main frame 1, then securing the stays 69, 69 through the collars 71, 72 and the bushes 73 to both sides of the main frame 1 by bolts 74, and securing the stay 70 through the collars 71, 72 and the bush 73 to the upper surface of the main frame 1 by bolts 74.

A pair of outlets 25, 25 are opened at the right and left side rear walls of the cleaner case 58, and are connected, as shown in FIG. 5, through conduits 26, 26 with the inlets of the pair of carburetors 27, 27, respectively.

Description will now be made of the operation of this embodiment. When the V-type engine E is operated, the intake vacuum acts through the intake manifolds 28, 28, the carburetors 27, 27 and the conduits 26, 26 to the air cleaner Ac. Thus, new air flows, as shown by arrows in FIGS. 5 and 6, from the inlet 68 into the uncleaning chamber $C_2$ of the air cleaner Ac by means of the intake vacuum. The air is then filtered and cleaned through the cleaner element 63 and is fed into the cleaning chamber $C_1$. The air flows from here through the outlets 25, 25, the conduits 26, 26, the carburetors 27, 27 and the intake manifolds 28, 28 into the two cylinders $Cy_1$, $Cy_2$.

Since the air cleaner Ac is straddled over the main frame 1 at a position upwardly forward of the main fuel tank 7 of large capacity as described above, the inlet 68 assumes an upper position on the body frame F, and foreign materials, such as dust and mud thrown about when the motorcycle travels, can be less taken into the air cleaner Ac through the inlet 68. Further, since the air cleaner Ac is disposed at an upper part of the body frame F, a relatively large space can be attained between the cylinders $Cy_1$, $Cy_2$ of the engine E and the outlets 25 of the air cleaner Ac, thereby facilitating the setting of the length of the intake system connecting them and its positioning to improve the performance of the engine E.

Since the main fuel tank 7 is divided into the left and right side tanks 7a and 7b as described above and both the tanks 7a and 7b are so hung as to cover both sides of the pair of carburetors 27, 27 and the pair of cylinders $Cy_1$, $Cy_2$ of the engine E, the capacity of the fuel tank can be made large to enable the motorcycle to travel a long distance. In addition, when the left side tank 7a is pivoted upwardly around the hinges 22, 22, the air cleaner Ac, the carburetors 27, 27 and the cylinders $Cy_1$, $Cy_2$ of the engine E can be exposed outside on the body frame F to place the surroundings open to the ambient air. Thus peripheral components can be easily subjected to the maintenance without being disturbed by the body frame F and the main fuel tank 7.

In addition, since the thick frames 20a, 20b welded to the tank are utilized to attach the hinges 22, 22 to the upper surfaces of the left and right side tanks 7a and 7b, these frames can function as reinforcing members to enhance the strength and rigidity of both the tanks 7a and 7b.

In the embodiment described above, the left side tank 7a is constructed to be rotatable. However, the present invention is not limited to the particular embodiment. For example, the right side tank 7b may be constructed to be rotatable on the contrary, or both the side tanks may be made rotatable.

FIGS. 8 to 11 illustrate a second embodiment of the present invention. This embodiment is different from the first embodiment in the arrangement of a main fuel tank 107 and radiators 114, 114.

Figure 11:
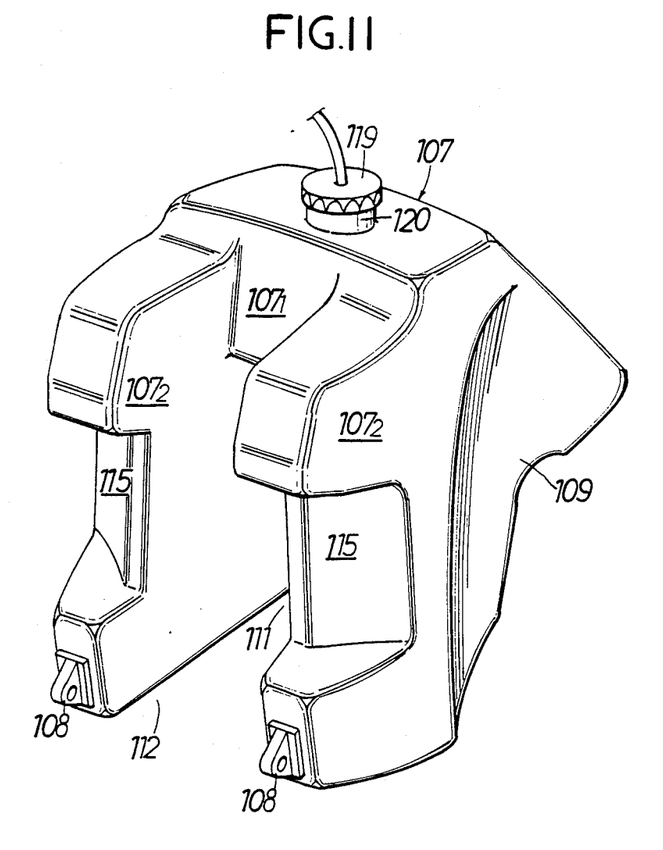
FIG. 11 is a perspective view of the fuel tank.

As shown in FIG. 11, a main fuel tank 107 is in a saddle shape composed of an upper tank portion $107_1$, and left and right side tank portions $107_2$, $107_2$ hung down integrally from both lateral sides of the upper tank portion $107_1$. Brackets 108, 108 for mounting on a body frame F are integrally projected from the lower front portions of the left and right side tank portions $107_2$, $107_2$. A filling port 120 is opened and is closable by a cap 119 at the upper center of the upper tank portion $107_1$.

Figure 8:
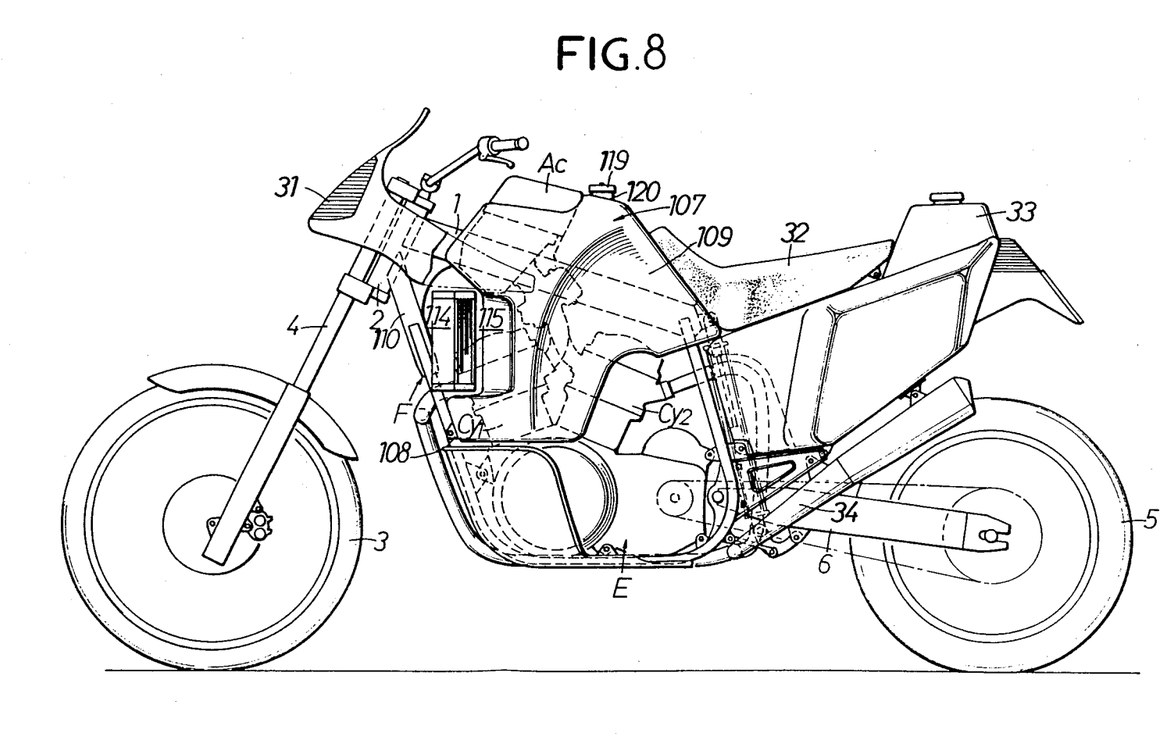
FIG. 8 is a side view of the entire arrangement of a motorcycle.

As shown in FIG. 8, the main fuel tank 107 is arranged on the body frame F to straddle over the main frame 1 and to cover the sides of the engine E. Brackets 108, 108 are secured by fittings such as bolts and nuts to a down tube 110 of the body frame F. A ventilation passage 111 having an inlet 112 and an outlet 113 on the front and rear sides is defined below the main frame 1 by the main fuel tank 107. The cylinders $Cy_1$, $Cy_2$ of the engine E are contained in the passage 111, and the left and right side tank portions $107_2$, $107_2$ of the main fuel tank 107 partially cover the left and right side surfaces of the engine E. The left and right side tank portions $107_2$, $107_2$ have outer surfaces recessed at rear half portions thereof into arcuate shape in plan view as shown in FIG. 10, and knee contacts 109, 109 are, as shown by dotted chain lines in FIGS. 9 and 10, formed for contact by the knees of both the legs of an occupant M.

A pair of radiators 114, 114 for cooling the water for the engine E are arranged in front of the main fuel tank 107, and supported by the body frame F. The radiators 114, 114 are distributed on left and right sides so as to provide a space in front of the inlet 112 of the passage 111, and are inclined to have their outer edges offset forward relative to their inner edges to direct the front surfaces toward a front laterally center position. Left and right side tank portions $107_2$, $107_2$ are disposed rearward of the radiators 114, 114. Correspondingly to the radiators, air guide surfaces 115, 115 of recessed curved configuration in cross section are formed on the fronts of the left and right side tank portions $107_2$, $107_2$ to bulge outwardly toward the rear. Thus, part of traveling air having passed the radiators 114, 114 is guided, as shown by arrows A in FIG. 10, by the air guide surfaces 115, 115 of the left and right side tank portions $107_2$, $107_2$ toward both the outsides of the main fuel tank 107.

Description will now be made of the operation of this second embodiment.

Figure 9:
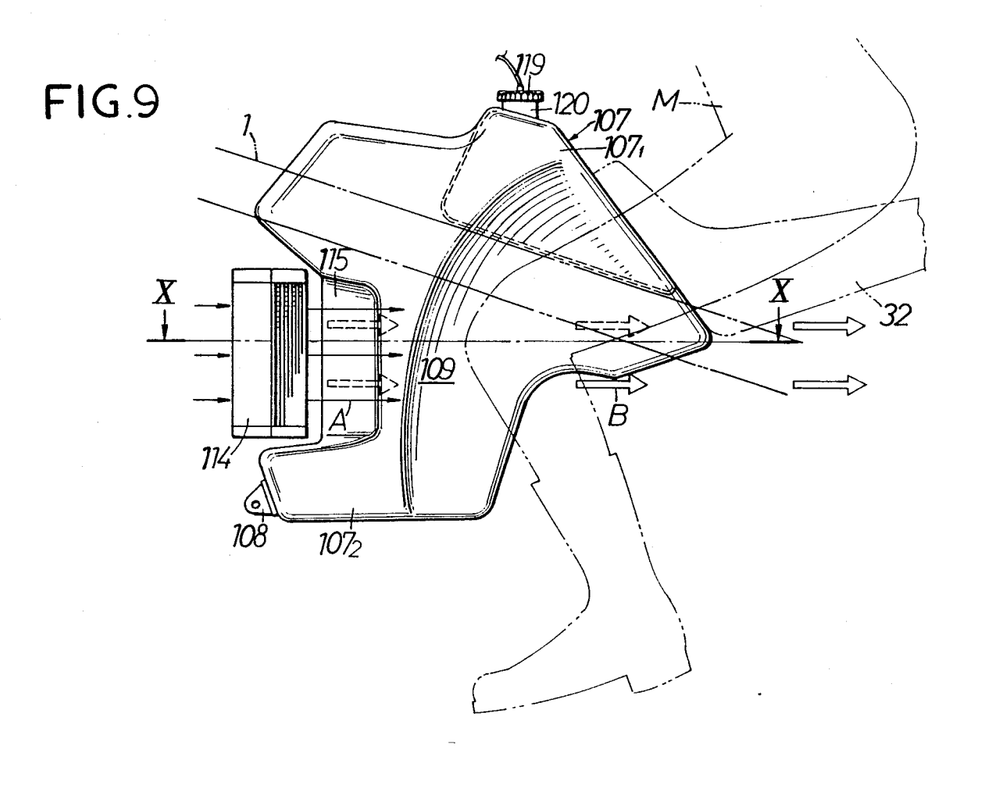
FIG. 9 is a side view of a fuel tank and radiators.
Figure 10:
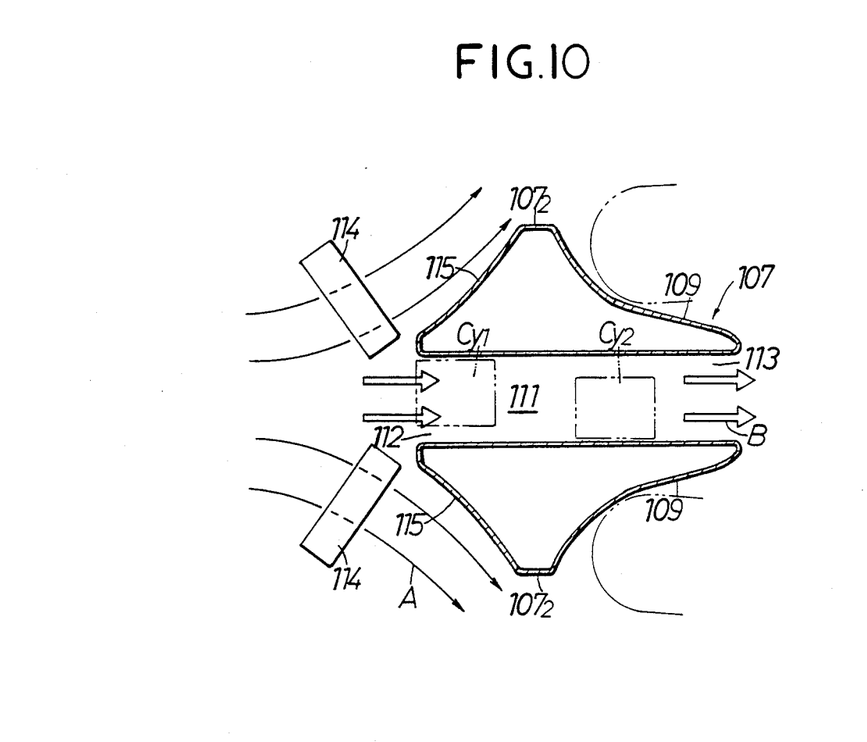
FIG. 10 is a sectional view taken along the line X—X in FIG. 9.

When the motorcycle thus constructed as described above travels, part of travelling air contacting the front surface of the motorcycle passes, as shown by arrows A in FIGS. 9 and 10, through the pair of radiators 114, 114 to effectively cool the radiators 114, 114, and is then guided along the air guide surfaces 115, 115 of the left and right side tank portions $107_2$, $107_2$, flowing toward the outsides, and the occupant on the motorcycle is not hit by the hot air which has passed the radiators 114, 114. Other part of the travelling air enters the passage 111, as shown by arrows B in FIGS. 9 and 10, to cool the engine E at that time, and then flows backwardly of the main fuel tank 107, which air does not substantially hit the occupant M.

Since the main fuel tank 107 is provided similarly to the first embodiment on the body frame F in a straddling manner over the main frame of the body frame F and its left and right side tank portions $107_2$, $107_2$ are hung down to a position below the main frame 1, even if the fuel tank 107 is formed in a large capacity, the center of gravity of the motorcycle can be avoided from undesirably rising upwards, and the weight balance of the motorcycle can be very improved. Further, since the left and right side tank portions $107_2$, $107_2$ are arranged to partially cover the left and right sides of the engine E and the knee contacts 109, 109 for the occupant M are formed on the rear portions of the outside faces of the left and right side tank portions $107_2$, $107_2$, the occupant M is less affected by the hot air generated from the engine E.

What is claimed is:

1. A motorcycle comprising a body frame, an engine on the body frame and a fuel tank carried on and straddled over a main frame of the body frame, said main frame extending longitudinally of the body of the motorcycle, wherein said fuel tank is divided into left and right side sections which are hung down to a position sideward of a cylinder of the engine and a carburetor for the engine, said left and right side sections being connected together at upper parts thereof by hinge means such that at least one of the side sections is pivotable upwards around said hinge means.

2. A motorcycle according to claim 1, wherein said hinge means is located above said engine cylinder.

3. A motorcycle according to claim 1, wherein an air cleaner is provided upwardly and frontwardly of said fuel tank.

4. A motorcycle according to claim 3, wherein said air cleaner is straddled over said main frame.

5. A motorcycle according to claim 4, wherein said engine is of multicylinder type, said air cleaner has a cleaning chamber divided into left and right side parts on the main frame, and a plurality of carburetors leading to a plurality of cylinders of said engine are arranged to communicate with the left and right side parts of said cleaning chamber.

6. A motorcycle according to claim 3, wherein said engine is located below said air cleaner, and said carburetor is disposed at a vertically intermediate position between said engine and said air cleaner.

7. A motorcycle according to claim 1, wherein said hinge means is attached to separate frames welded to upper surfaces of said sections.

8. A motorcycle according to claim 4, wherein said engine is located below said air cleaner, and said carburetor is disposed at a vertically intermediate position between said engine and said air cleaner.

9. A motorcycle including a body frame having a main frame element extending longitudinally between a front wheel and a wheel thereof, an engine supported by said body frame beneath said main frame element, and a fuel tank carried by said body frame for operation with said engine, said fuel tank comprising:
 a body having a generally bifurcate cross-sectional shape defining a support portion fixedly supported by said main frame element and oppositely spaced depending sections enclosing adjacent sides of said engine; and
 hinge means connecting at least one of said depending sections to said support portion to enable pivotal movement of said at least one depending section about a substantially longitudinally extending axis to effect access to said engine.

* * * * *